United States Patent [19]

Rough

[11] 3,893,836

[45] July 8, 1975

[54] ROTARY GLASSMAKING REFINE WITH DIAMETER SENSING MEANS

[75] Inventor: Robert R. Rough, Toledo, Ohio

[73] Assignee: Owens-Illinois, Inc., Toledo, Ohio

[22] Filed: Oct. 16, 1974

[21] Appl. No.: 515,283

Related U.S. Application Data

[63] Continuation of Ser. No. 342,291, March 16, 1973, abandoned.

[52] U.S. Cl. .................. 65/164; 65/340; 73/290
[51] Int. Cl. ............................................. C03b 5/18
[58] Field of Search ....... 65/160, 29, 158, 164, 134, 65/340; 33/126 A, 126, 172 E; 73/290

[56] References Cited
UNITED STATES PATENTS

| | | | |
|---|---|---|---|
| 3,129,084 | 4/1964 | Labino | 65/134 X |
| 3,348,936 | 10/1967 | Clark et al. | 65/160 |
| 3,502,457 | 3/1970 | Bublitz et al. | 65/164 X |
| 3,607,193 | 9/1971 | Bourgraff | 65/164 X |
| 3,754,886 | 8/1973 | Richards et al. | 65/134 |

*Primary Examiner*—Robert L. Lindsay, Jr.
*Attorney, Agent, or Firm*—E. F. Dwyer; E. J. Holler

[57] ABSTRACT

A method and apparatus for refining molten glass wherein the unrefined molten glass is introduced continuously into one end of an open-ended container, the container is rotated to provide a void in the mass of glass in the container and cause the gaseous inclusions therein to be removed by the action of centrifugal force, the glass is continuously removed from the other end of the container, and the amount of glass in the container is controlled by sensing the internal diameter of the void of the glass and controlling the position of a rod in the outlet opening thereby restricting or enlarging the size of the opening or controlling the feeding of glass making materials to the container.

1 Claim, 6 Drawing Figures

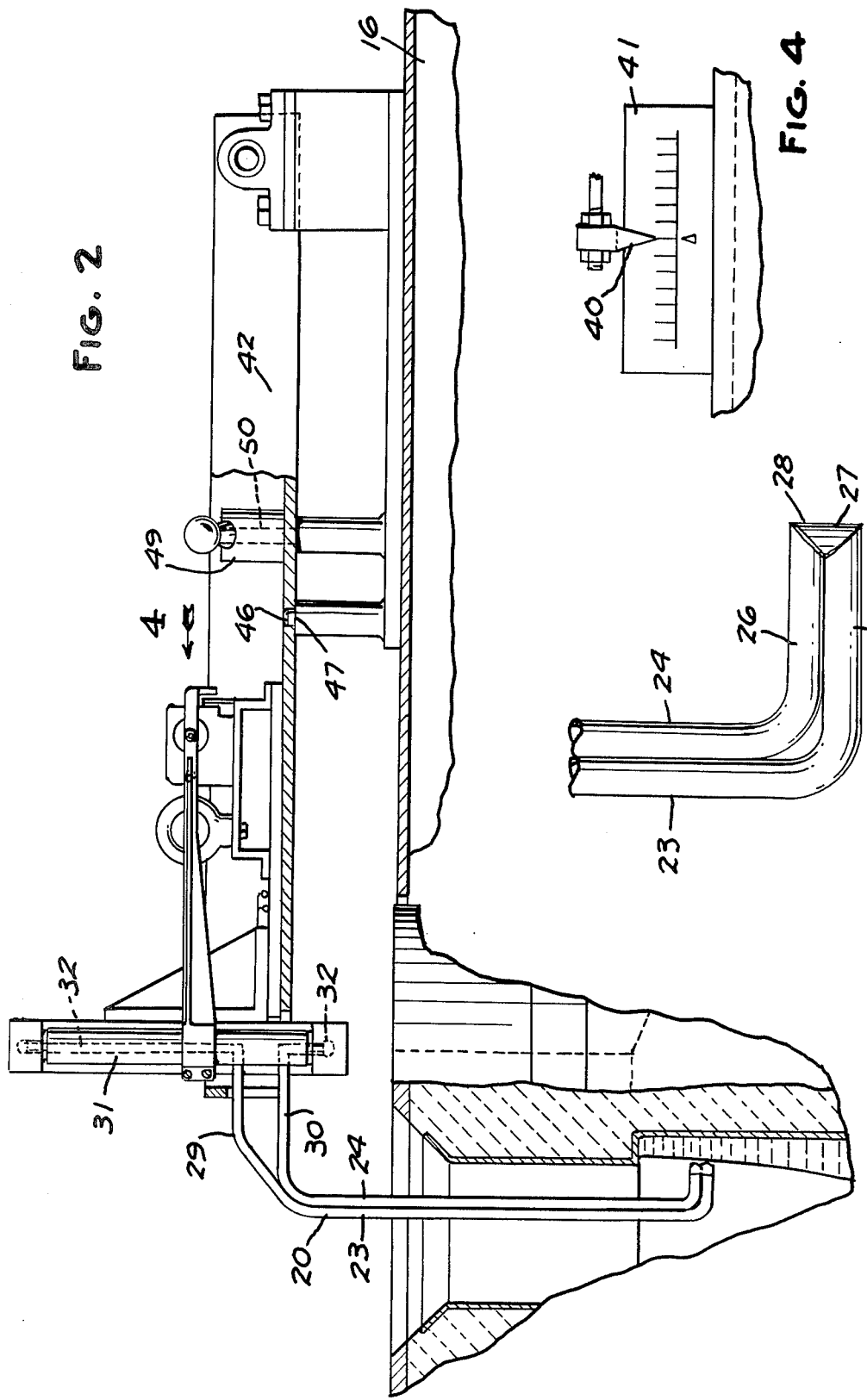

ROTARY GLASSMAKING REFINE WITH DIAMETER SENSING MEANS

This is a continuation of application Ser. No. 342,291, filed Mar. 16, 1973, now abandoned.

This invention relates to refining molten glass and more particularly to refining molten glass by subjecting the glass to centrifugal action.

BACKGROUND OF THE INVENTION

In the copending application of Richards et al., Ser. No. 130,672, filed Apr. 2, 1971, now U.S. Pat. No. 3,754,886 having a common assignee with the present application, there is disclosed and claimed a method and apparatus for refining glass wherein the unrefined molten glass is continuously introduced into one end of an open-ended container or chamber, the chamber is rotated to form a void and the glass is subjected to centrifugal action to cause the gaseous inclusions in the glass to migrate toward the center of the void and finally the glass is continuously withdrawn from the other end of the open-ended chamber. In order to provide for accurate control of the degree of refining, it is important to know the amount of glass in the rotating container, and to control the amount of glass in the chamber; a rod or other device is provided in the other end of the chamber to restrict the flow of glass out of the chamber.

Among the objects of the invention are to provide a method and apparatus wherein the control of the amount of glass in the chamber is related directly to a measurement or sensing of the glass by sensing the diameter of the void in the rotating mass of glass, which will automatically and continuously control the amount of glass in the chamber; which method and apparatus is relatively simple and inexpensive; and which apparatus will withstand the temperatures involved.

SUMMARY OF THE INVENTION

In accordance with the invention, the amount of glass in the rotating chamber is sensed by moving a probe radially outwardly within the void formed by the rotating mass of glass in the chamber. The position of the probe is a measure of the amount of glass in the chamber and is used to control the amount of glass in the chamber by controlling the efflux of refined molten glass or the introduction of unrefined molten glass.

DESCRIPTION OF THE DRAWINGS

FIG. 2 is a part sectional elevational view on an enlarged scale of a portion of the apparatus shown in FIG. 1.

FIG. 3 is a fragmentary enlarged view of a portion of the apparatus shown in FIGS. 1 and 2.

FIG. 4 is a fragmentary view taken in the direction of the arrow shown in FIG. 2.

DESCRIPTION

Figure 1:
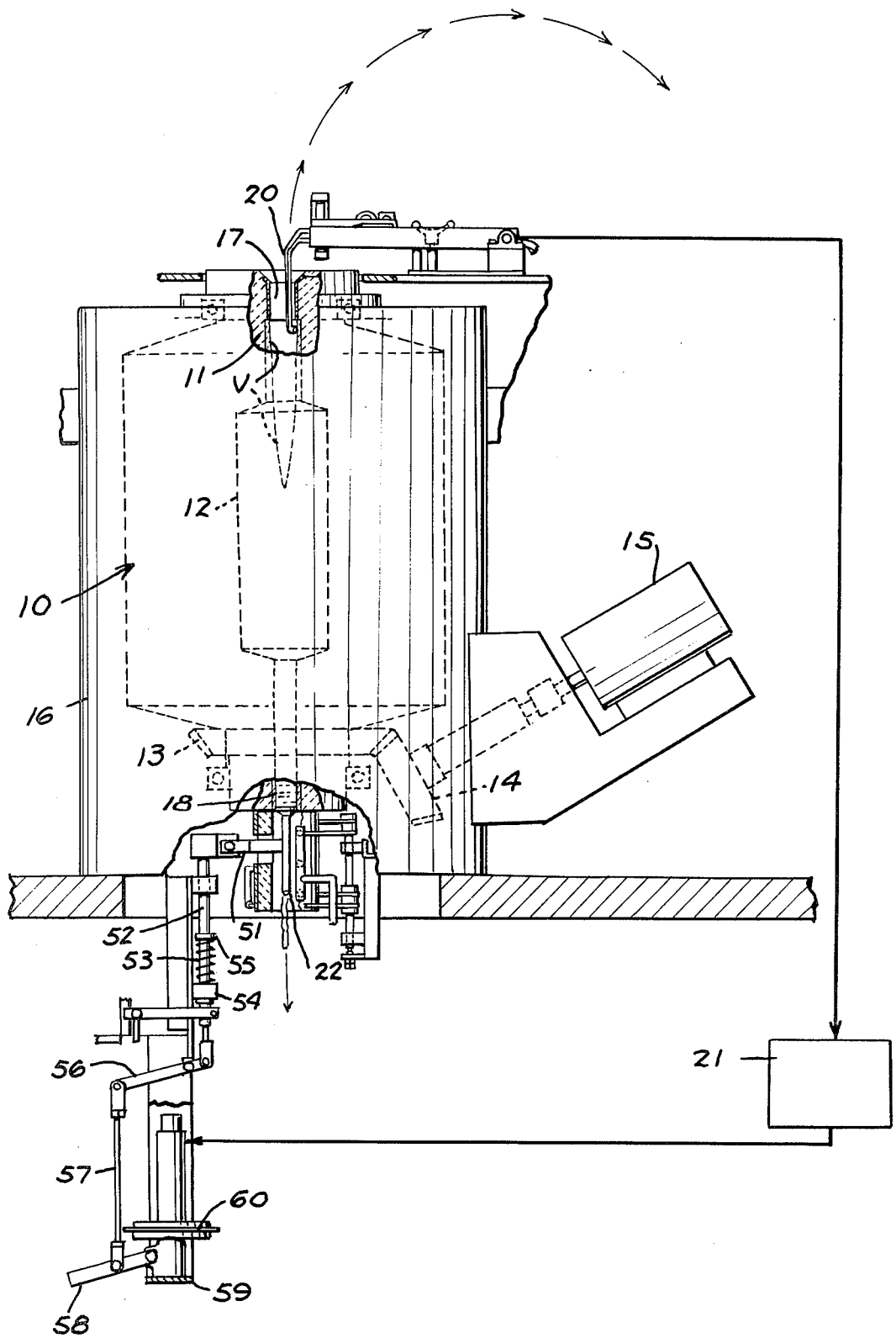
FIG. 1 is a part sectional partly diagrammatic elevational view of an apparatus embodying the invention.
Figure 5:
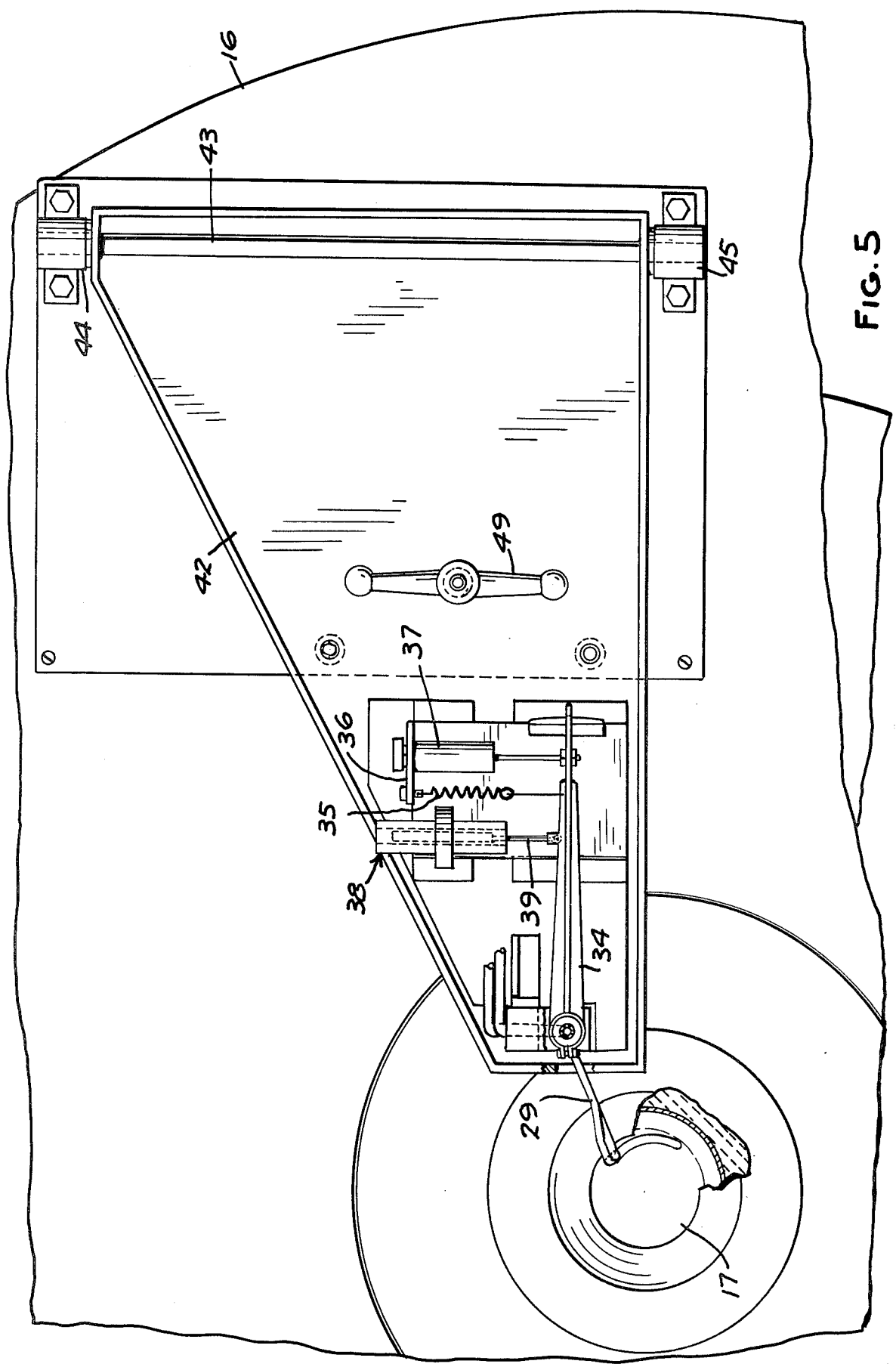
FIG. 5 is a fragmentary plan view of the apparatus shown in FIG. 2.

Referring to FIG. 1, the apparatus shown comprises a rotatable container 10 that has a refractory liner 11 defining a chamber 12. The upper and lower ends of the chamber 12 are open and the container 10 is adapted to be rotated by meshing bevel gears 13, 14 which are rotated by a motor 15. The rotating container 10 is surrounded by stationary housing 16.

Glass is continuously introduced into the open upper end 17 of the container and upon rotation of the container, a void V is produced due to centrifugal action. Gaseous inclusions in the glass are caused to move to the void, thus converting the unrefined molten glass to molten glass. The refined molten glass passes downwardly through the outlet 18 continuously. The aforementioned and described apparatus is more completely disclosed and described in the aforementioned patent application, Ser. No. 130,672, filed Apr. 2, 1971 now U.S. Pat. No. 3,754,886.

In accordance with the invention, the diameter of the inner surface of the glass at a point adjacent the upper end of the void V is continuously sensed, and this is used to control the efflux of glass from the outlet 18, or the feeding of unrefined molten glass to the rotating container.

More specifically, as shown in FIGS. 1–5, a probe 20 is yieldingly urged radially outwardly against the surface of the glass and the position of the probe 20 determines the diameter of the glass at that point. This, in turn, is a measure of the amount of glass in the chamber 12. The position is converted to an electrical signal and directed to a comparator 21 that compares the position with a predetermined standard and produces a control signal to control the position of a rod 22 vertically toward and away from the outlet 18, thereby controlling the rate at which the glass leaves the chamber 12.

As shown in FIGS. 2–5, the probe 20 comprises a pair of juxtaposed hollow tubes 23, 24 which have the major portions thereof in juxtaposed position and the lower ends 25, 26 thereof extending horizontally when the device is in operative position. The ends of the tubes are interconnected by a portion 27 that forms a sharp exterior contacting point 28. The upper ends of the tubes 23, 24 extend radially outwardly as at 29, 30 to a manifold 31 that has bores 32, 33 communicating with an inlet and an outlet so that water can be continuously circulated through the tubes 23, 24 to cool the probe 20. An arm 34 extends between the arm and a bracket 36 to yieldingly urge the arc in a counterclockwise position as viewed in FIG. 5 and, in turn, urge the tip 28 of the probe 20 against the glass. A dashpot 37 dampens the movement of the arm 34 and, in turn, the probe 20. An electrical transducer 38 has its coil fixed and has its armature 39 connected to the arm 34 so that the transducer 38 will produce a signal corresponding to the position of the probe 20. Additionally, the arm 34 has an indicator 40 thereon that cooperates with a fixed scale 41 to give a visual reading of the position of the probe 20. The manifold 31, bracket 36 and transducer 38 are mounted on a plate 42 that is pivoted by a horizontal rod 43 in pillow blocks 44, 45 on the stationary housing 16. By this arrangement, the probe 20 and associated mechanism form an assembly that can be swung into sensing position or out of sensing position. A locating dowel pin 46 extends into an opening 47 in the plate 42 (FIG. 2) and a locking nut 49 is threaded onto a screw 50 that extends up through an opening in the plate to lock the assembly in sensing position.

Referring to FIG. 1, the rod 22 that controls the efflux of glass has a laterally extending projection 51 which, in turn, is fixed to the upper end of shaft 52. The shaft 52 is yieldingly urged upwardly by a spring 53 interposed between a fixed bracket 54 and a collar 55. The lower end of the shaft 52 is connected to a link 56 which, in turn, is connected by a connecting rod 57 to a lever 58. The lever 58 is pivoted to a support 59 and has its ends connected to a diaphragm 60. The comparator 21 controls the fluid on the upper end of the diaphragm 60 and thereby causes a motion of the diaphragm 60 which through the linkage positions continuously the rod 22 and, in turn, controls the amount of glass which is permitted to continuously leave the chamber. In this manner, the amount of glass in the chamber is continuously controlled.

Figure 6:
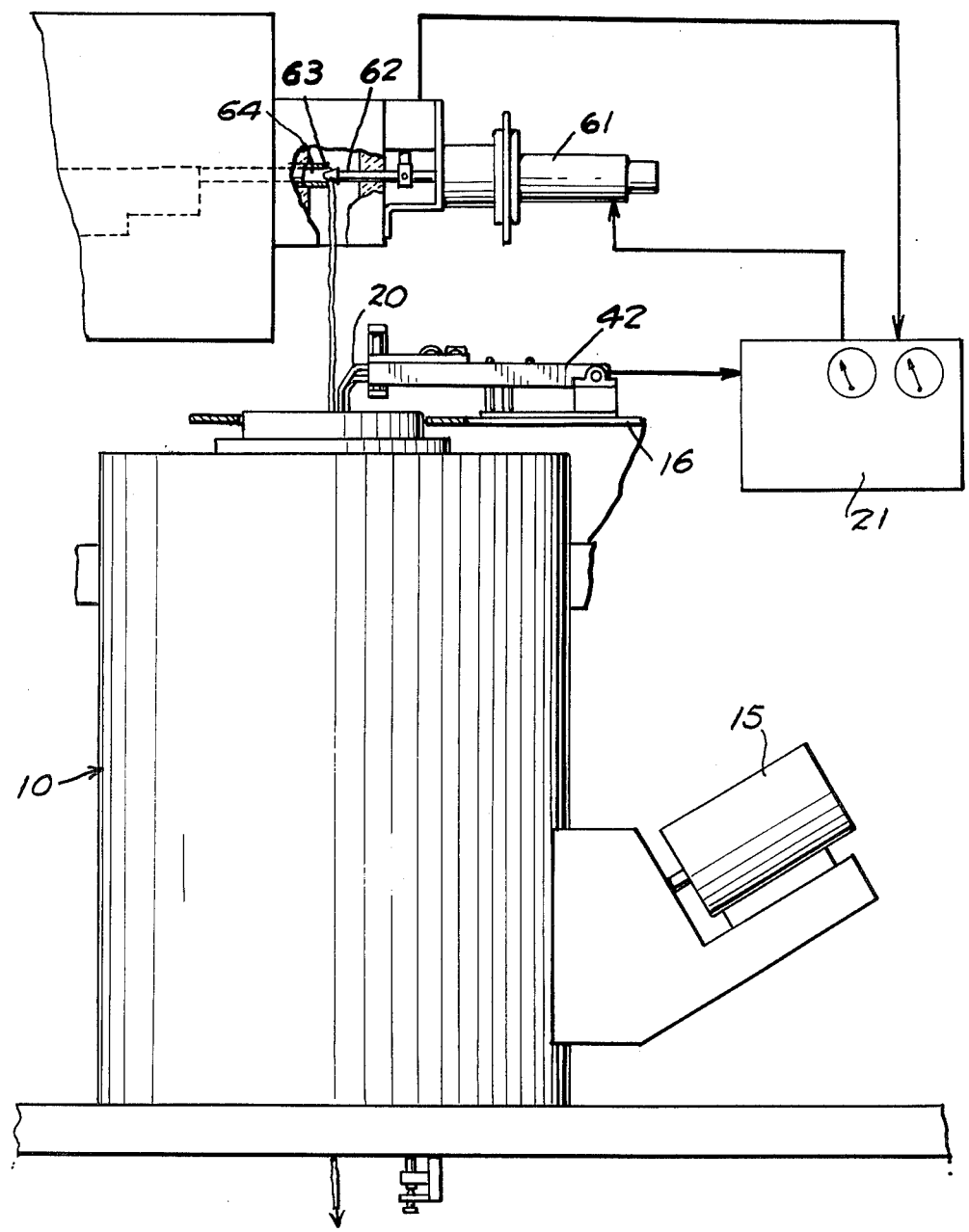
FIG. 6 is a partly diagrammatic elevational view of a modified apparatus embodying the invention.

Alternatively, as shown in FIG. 6, the comparator 21 can control a plunger for feeding unrefined molten glass to the rotating container. Specifically, the comparator 21 controls a diaphragm type cylinder 61 which moves a plunger 62 to control the flow through a supply opening 63 of a passage 64 to the rotating refining container.

I claim:

1. Apparatus for measuring the volume of molten glass in a rotating chamber comprising:
   a. an open-ended rotatable chamber for receiving molten glass;
   b. a probe, said probe positioned within the container so as to be within a void developed in a rotating mass of glass in the container, said probe comprising a pair of hollow tubes, a portion of each tube extending horizontally, said tubes being interconnected forming a molten glass contacting point, said tubes extending radially outwardly;
   c. a manifold, said manifold connecting with said tubes to provide a continuous path for circulating cooling fluid in said tubes;
   d. an arm, said arm connected with said probe, and said arm yieldingly urging the probe so as to urge the tip of the probe against the molten glass;
   e. an electrical transducer, said transducer connected to the probe so that the transducer produces an electrical signal corresponding to the position of the probe;
   f. means for movably positioning said probe in said container, movable freely into or out of the chamber;
   g. readout means for visually displaying the position of the probe; and
   h. means for circulating cooling fluids within the hollow tubes to prevent damage from contact with molten glass in the chamber.

* * * * *